G. F. CAPRON.
NUT LOCK.
APPLICATION FILED JAN. 9, 1917.

1,256,436.

Patented Feb. 12, 1918.

Geo. F. Capron,
Inventor

By Geo. P. Kimmel,
Attorney

UNITED STATES PATENT OFFICE.

GEORGE F. CAPRON, OF EL PASO, TEXAS.

NUT-LOCK.

1,256,436.  Specification of Letters Patent.  Patented Feb. 12, 1918.

Application filed January 9, 1917. Serial No. 141,418.

*To all whom it may concern:*

Be it known that I, GEORGE F. CAPRON, a citizen of the United States, and resident of El Paso, in the county of El Paso and State of Texas, have invented certain new and useful Improvements in Nut-Locks, of which the following is a specification.

The present invention relates to nut locks.

It is the object of this invention to provide a device, by means of which a nut can be effectively locked on a threaded bolt or stud against accidental movement and which is adapted to be detached without damaging the nut or bolt, and which will permit of a nut being removed and replaced whenever desired without destroying the thread.

Other improvements and novel details in the construction and arrangement of the various parts of the nut lock will be brought out more in detail in the description to follow, which, for a clear understanding of the invention, is to be considered in connection with the accompanying drawings, forming a part hereof, and wherein is disclosed for the purpose of illustration, convenient and satisfactory embodiments of the invention.

It is to be noted, in this connection, that the minor changes in the construction and arrangement of the parts may be made without departing from the spirit of the invention and the principle of operation of the various parts.

Figure 1:
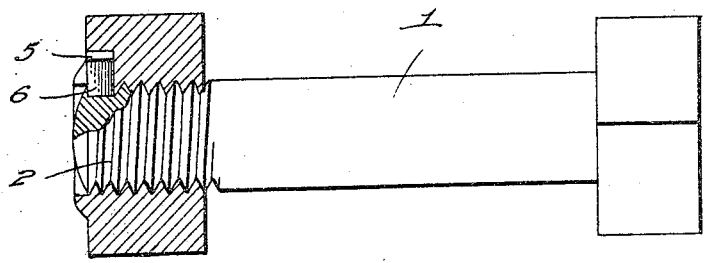
Figure 1 is a side elevation of my invention. part thereof being in section.
Figure 2:
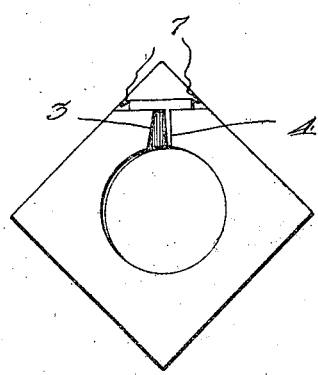
Fig. 2 is an end elevation of the same.
Figure 3:
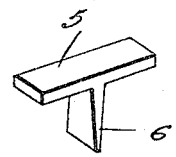
Fig. 3 is a perspective view of a T-shaped locking pawl.

Referring more particularly to the drawings wherein similar characters of reference designate like and corresponding parts throughout the various views in which the bolt 1 is provided with the common form of threaded end 2. The lock nut of my invention is provided with a substantially T-shaped recess having its stem or radially extending portion thereof substantially wedge-shape. The side 3 of the said wedge-shaped recess being at an angle, and the opposite side 4 extending radially from the center thereof. The larger surface of the wedge-shaped recess being adjacent the periphery of the opening in the center of the nut for accommodating the bolt 1.

The T-shaped locking pawl of my invention comprises a body portion 5 having a laterally extending wedge-shaped member 6 intermediate the ends thereof.

In use the pawl is inserted in the T-shaped recess and retained therein by bending the edges 7 of the nut adjacent the ends of the groove into the cut-out portion by means of a hammer. The spring stem 6 will be flexed to the sides 3 of the groove when the nut is being placed on the bolt to permit the rotation of the same. It is obvious that the nut cannot be displaced unless the pawl is first removed, as upon a tendency of the nut to unscrew the spring stem 6 will bite into the thread and lock the nut on the bolt.

To remove the nut from the bolt all that is necessary is a chisel and a hammer first removing the portion 7 and then sliding the pawl out of the opening.

From the above description taken in connection with the accompanying drawings, it can be easily seen that I have provided a nut lock that is simple in construction, that can be cheaply manufactured and when assembled can be placed upon the market and sold at a minimum cost.

Having thus fully described my invention, what I claim as new and desire to secure by Letters Patent is:

In combination with a nut having a substantially T-shaped recess formed therein, a portion of which terminates at a point adjacent the bolt receiving opening therein, a T-shaped pawl receivable in said recess and held therein against displacement by bending portions of the nut over the ends thereof, the lateral portion of said pawl being rigid and the longitudinal portion thereof being flexible and projecting into the bolt receiving opening, as and for the purpose set forth.

In testimony whereof, I affix my signature hereto.

GEORGE F. CAPRON.

Copies of this patent may be obtained for five cents each, by addressing the "Commissioner of Patents, Washington, D. C."